Nov. 22, 1938.   S. PRZYBOROWSKI   2,137,348
METHOD OF MAKING A RADIATOR RIBBON
Original Filed Jan. 28, 1935
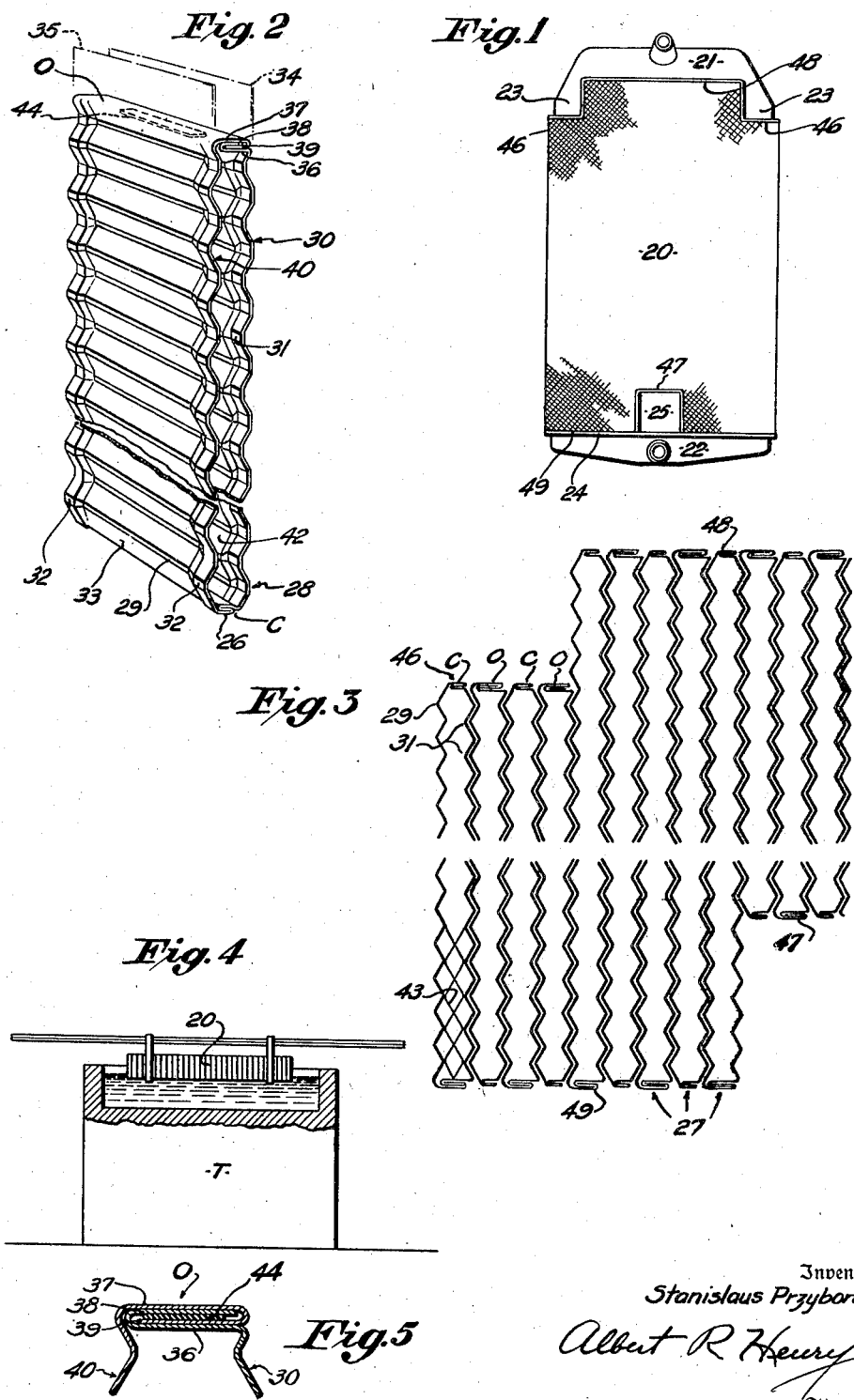
Inventor
Stanislaus Przyborowski
Albert R. Henry
Attorney Patented Nov. 22, 1938

2,137,348

UNITED STATES PATENT OFFICE 2,137,348

METHOD OF MAKING A RADIATOR RIBBON

Stanislaus Przyborowski, Tonawanda, N. Y., assignor to Fedders Manufacturing Company, Inc., Buffalo, N. Y.

Original application January 28, 1935, Serial No. 3,796. Divided and this application July 23, 1937, Serial No. 155,253

1 Claim. (Cl. 113—118)

This invention relates to the art of making radiator cores of the cellular type, and it is a division of my copending application Serial No. 3,796, filed January 28, 1935.

Cores of this type have long been produced by arranging previously assembled ribbon units in juxtaposed relation and solder dipping the faces of the assembly to provide a rigid and substantially homogeneous structure. The units have been formed of an outer or water bearing ribbon bent upon itself to form an enclosure and an inner or spacer ribbon or ribbons inserted therein and providing air fin elements.

In connecting the free ends of the outer ribbon to complete the enclosure, various types of interlocking joints have been utilized, none of which have proved waterproof, and as a result, it has been common practice to solder these joints by dipping the ends of the previously integrated core. This practice has caused much trouble, as the solder thus has been applied impartially to the entire area of the core ends, with the objections that water passages have been blocked by solder and dross, solder has been wasted, and most serious, the previously soldered ribbons have been reheated and the joints therein accordingly weakened. Recently, these objections have been considerably aggravated, due to the demand for cores having irregular ends, which has necessitated group dipping or hand soldering non-planar portions of the core ends.

I propose to eliminate entirely the steps of dipping the ends of the core by providing a core wherein the joints are soldered at the same time the core is integrated by face dipping. To this end, I provide an outer ribbon structure where the joint has been provided with an advantageously located insert of cold solder wire containing its own flux, and which, when the core is face dipped, will be fused in the joint without waste or defacement of the core ends.

One well known form of radiator unit containing the solder insert is described and shown in the ensuing specification and drawing, wherein:

Fig. 1 is a front elevation of a radiator assembly including top and bottom tanks;

Fig. 2 is a perspective view of a completed outer ribbon;

Fig. 3 is an enlarged diagrammatic cross section through the left hand portion of the core of Fig. 1;

Fig. 4 is a vertical section through a dipping tank showing a radiator being surface dipped therein;

Fig. 5 is an enlarged cross section through the open end header of the unit of Fig. 2.

In the drawing, Fig. 1 shows a radiator comprising a core 20 of the cellular type to which is secured an upper tank 21 and a lower tank 22. To illustrate the adaptability of the core structure of the invention, the upper tank is shown as of an exceptional type having depending portions 23 at opposite ends to which the core is devised to conform. The lower tank has the conventional planar flanged face 24, and the usual attached crank box 25 which presents a rectilinear insert in the lower face of the core.

The core 20 is likewise of a familiar type, consisting of juxtaposed sections or units 27 (Figs. 2 and 3) each comprising a water tube ribbon or "outer" 28 formed with transverse corrugations defined by outer crests 29 and inner crests 31, and having longitudinal offset portions 32 at opposite sides forming a longitudinal depression 33 therebetween. This ribbon is cut into suitable lengths and then folded into two legs 30 and 40 having their inner crests 31 disposed in opposition (Fig. 2). On the line of fold, the ribbon is overlapped as indicated by the numeral 26, so that the crests 31 are spaced, and additionally, a tapering characteristic is given this end of the outer, which will hereinafter be referred to as the closed end header "C".

The free ends 34 and 35 of the ribbon legs 30 and 40 are subsequently folded inward from the outer crests 29, forming horizontal sections 36 and 37, and bent back to form sections 38 and 39 respectively, which sections interlock as shown in Figs. 2 and 3, to complete the open end header "O".

The enclosure 42 thus provided within the outer 28 is utilized to receive a spacer or corrugated double fin ribbon 43, which is shown diagrammatically in Fig. 3, and, since it has only a casual bearing on the present invention, it will not be further discussed. As thus far described, the core is of the conventional double spacer, cellular type, and old with me. It is used for exemplary purposes to illustrate the invention, and it will be hereinafter apparent that other forms of cellular cores may be utilized with equal facility.

Simultaneously with the formation of the open end header O, I propose to insert a section 44 of solder wire in the interlocking joint thereof (Fig. 2) so that in the assembly it is flattened and securely imprisoned. This wire is preferably of a known commercial type, being tubular with a core of flux. And it is thus adapted, when fused by the suitable application of heat, to seal the joint in an effective manner.

To assemble the core, the ribbon sections are stacked in a suitable frame in internesting relation, and with alternate sections inverted, so that the headers C and O thereof are disposed alternately to provide planar and substantially uninterrupted horizontal surfaces for the subsequent reception of the tanks. The sections are then clamped together and the front and rear surfaces are successively immersed in a tank T of molten solder for a slight depth (Fig. 4). As a result, the inner and outer ribbons are integrated and likewise the water passages between the outer ribbons are sealed to form an integral structure.

During the described solder dipping operation, the ribbons become heated sufficiently to fuse the solder inserts 44 in the open end headers O, and, when the core is permitted to cool, it will be found that the interlocking joint structures therein are perfectly sealed.

In contrast, prior to the present invention, it was necessary to solder the open end headers O in a separate operation. In cores having planar upper and lower faces, this involved the solder dipping thereof after the front and rear face dipping operation, with the attendant danger of reheating, the waste of solder, and the danger of blocking or partially blocking the open water passages with excess solder or dross.

In cores having offset portions, such as shown in Fig. 1, the header surfaces 46 and 47 remote from the extreme top and bottom surfaces 48 and 49, had to be separately soldered, involving the end dipping of these groups of sections prior to assembly and the subsequent end dipping of the surfaces 48 and 49 after assembly. In the present invention, regardless of frontal irregularity of the core, the interlocking joints are all sealed in the face dipping operation, thus eliminating what has previously been considered necessary extra operations.

The water tube ribbons 28, supplied with the solder insert as shown in Fig. 2, may be handled or shipped as independent units for ultimate assembly into cores or for replacing damaged ribbons in repair jobs.

In the aforementioned copending application, I have disclosed a machine for forming the joint in the header O and for simultaneously introducing the solder insert 44 therein, and reference may be had thereto for details of the machine, which need not be described herein.

It will be obvious to those skilled in the art that the present invention may be applied to other types of cellular cores without departing from the scope of the invention, as set forth in the accompanying claim.

I claim:

The method of integrating cellular radiator cores which comprises forming a plurality of units each comprising a spacer ribbon and an enclosing water tube ribbon, forming a joint in the free extremities of the water tube ribbon, and simultaneously inserting a section of solder wire therein, and finally in face dipping the core in molten solder to connect the ribbons and to fuse the solder in the joint by the transference of heat from the molten solder to the joint.

STANISLAUS PRZYBOROWSKI.